Feb. 1, 1966     W. C. BARKER     3,233,238
RADAR CAMOUFLAGE ARRANGEMENT
Filed June 5, 1962
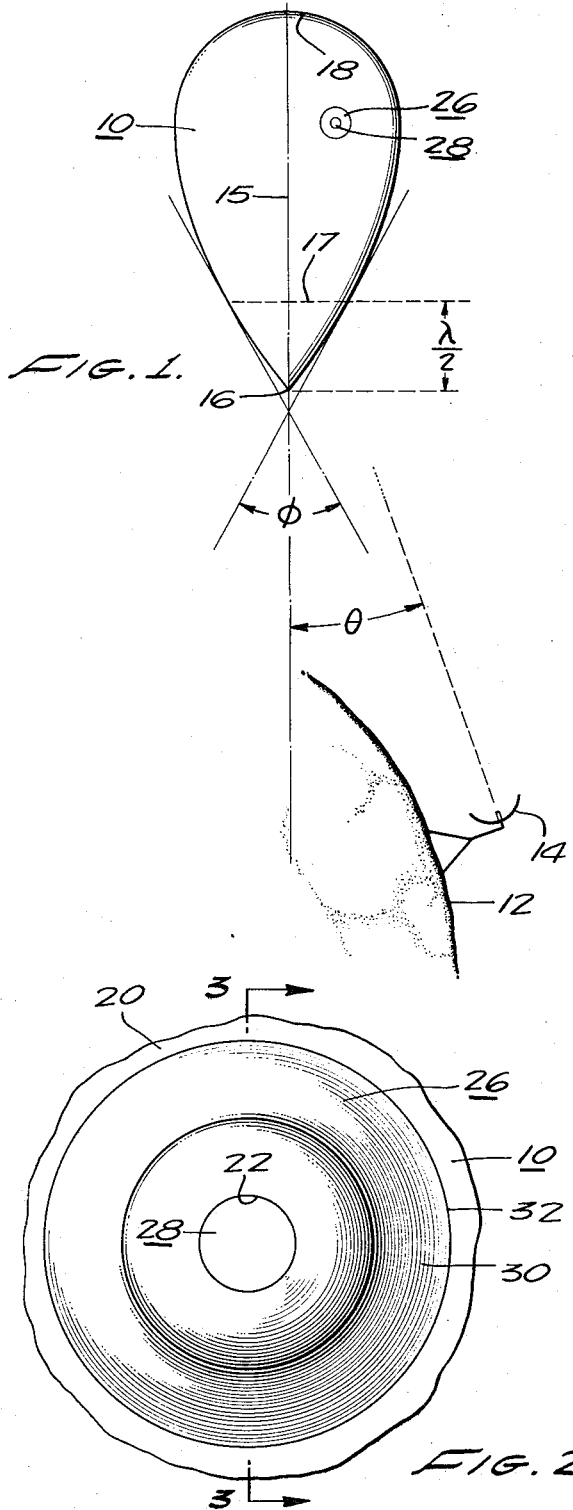
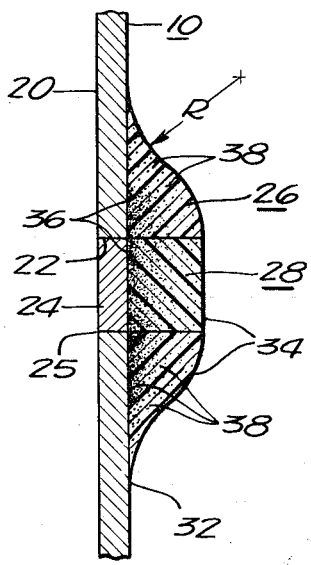
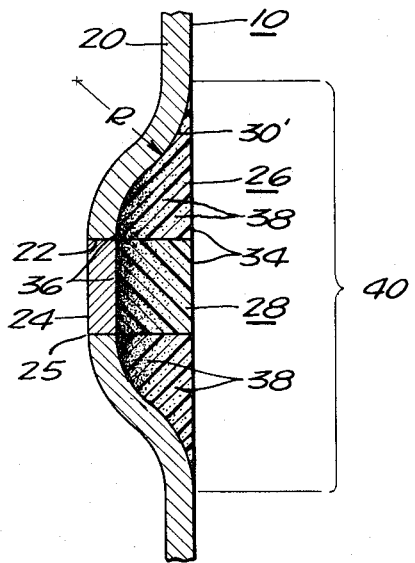
WILLIAM C. BARKER
INVENTOR.
BY David P. Ogden
ATTORNEY

# United States Patent Office 3,233,238
Patented Feb. 1, 1966

3,233,238
RADAR CAMOUFLAGE ARRANGEMENT
William C. Barker, Pacific Palisades, Calif., assignor to
The Aerospace Corporation, Los Angeles, Calif., a corporation of California
Filed June 5, 1962, Ser. No. 200,902
7 Claims. (Cl. 343—18)

The present invention relates to space vehicles, and more particularly to the art of reducing to a minimum radar reflection from space vehicles.

It is presently known that space vehicles constructed in a configuration electromagnetically equivalent to an infinite conducting cone can provide a radar reflection area (scatter cross section) of the order of a square centimeter, depending upon the frequency of the illuminating radar, the angle at the cone apex, and the reflections due to first or second order discontinuities in the vehicle surface structure when radar signals impinge thereon along the axis of the cone. This phenomenon remains substantially the same for radar signals as much as 40° to 60° from the axis of the cone so long as the front portion of the cone has a radius of curvature not greater than one-quarter inch. Moreover, this phenomenon is modified only slightly if the cone, instead of being infinite, is large compared to radar wavelengths and is terminated by a hemisphere-like rear end portion so long as the meeting of the curves is relatively smooth in both the first and second derivatives. If the apex angle of the cone is 52° the minimum signal obtainable is of the order of $10^{-4}$ square meters. At about 30° this reflection is reduced by one order of magnitude, and at about 16° the signal is reduced another order of magnitude. In practice this order of reflective signal is so small that irregularities and discontinuities in rearward portions of the vehicle will control the magnitude of the reflected signal.

However, in large space vehicles of the type where this phenomenon is of particular value, practical usage will require discontinuities for ports of various types such as communication ports, personnel entrances and cargo-loading ports. Such ports of necessity will provide electrical discontinuities in the surfaces which are dissipating the radar signals. These discontinuities tend to generate reflected signals which destroy the radar invisibility of the craft.

Therefore, an object of the present invention is to provide an arrangement for preventing reflection of signals from port hole discontinuities.

According to one embodiment of my invention, the surface surrounding a necessary port of a space craft is provided with a lossy dielectric material in proximity therewith. The lossiness of this material is sequentially increased or tapered so that at its initial contact with the surface farthest from the port it has very nearly the same impedance and loss characteristics as free space, while its lossy property juxtaposed to the port will completely dissipate any traveling waves. Moreover, the thickness of this lossy material is also tapered to be initially of the order of a few microns in thickness and finally of the order of two wavelengths of the minimum frequency that can be effectively used to detect the space vehicle from earth based radars. The consistency of this lossy washer is further controlled in that its outer surface is of relatively low lossy properties, while its base surface is very lossy. Such a washer surrounding a port, either open or closed, will dissipate traveling surface waves created by radar impingement elsewhere on the vehicle and prevent any reflection because of the discontinuity at the port. Furthermore, when such a port is closed and filled by a plug having the same lossy characteristics as those of the thick portion of the washer where it is juxtaposed to the plug, then the washer plus plug combination will prevent directly incident radar waves from being reflected at the port discontinuity.

The subject matter which is regarded as this invention is particularly pointed out and distinctly claimed in the concluding portion of this specification. The invention, however, as to its organization and operation, together with further objects and advantages thereof, will best be understood to reference to the following description taken in connection with the accompanying drawing in which:

FIG. 1 shows schematic plan view of a space craft arranged to be substantially invisible to radar signals impinging upon its forward end;

FIG. 2 is an enlarged plan view of a port arrangement shown in FIG. 1;

FIG. 3 shows schematic cross-sectional view taken along line 3—3 of FIG. 2 to illustrate the port arrangement of the present invention; and FIG. 4 illustrates in cross-section another embodiment of my invention.

Referring now to the drawing wherein like numbers designate similar parts, a space craft 10 is positioned above the earth 12 at an altitude of the order of 500 miles or more. As a result, search radar signals from an antenna system 14 will impinge upon the space craft 10 at incident angles $\theta$ less than the critical value whereby the reflection from the space craft 10 will be similar to that of an infinite conducting cone receiving radar signals along its axis illustrated by the space craft axis 15.

In order to take full advantage of the invisibility phenomenon of an infinite cone, the apex 16 has a radius of curvature less than one-quarter inch and is pointed directly toward the earth 12. Moreover, the effective apex angle, $\phi$, is less than 52°, whereby the cross-sectional area of a reflected signal is of the order of $10^{-4}$ square meters at radar frequencies of 1 kilomegacycle or greater. For the particular applications under consideration utilizing this invention radar frequencies of less than 1 kilomegacycle will not be particularly effective. However, for the purpose of discussion here, I am assuming that radar frequencies as low as 100 megacycles may be used. In either event, the apex angle $\phi$ is a measure of the angle of intersecting tangents developed from the annular surface, as indicated by a dashed line 17 which is one-half wavelength from the physical apex 16. Thus, if the apex angle is physically made as large as would be required by other considerations but with the surface curving inwardly from the cone, as illustrated in FIG. 1, then the effective angle, $\phi$, will always be less than the physical angle at the apex 16.

Other problems are apparent in this particular manner of operation. For instance, reverse curves tend to focus search radar signals to increase substantially the reflected signal. Therefore, the vehicle envelope should be a convex surface; also, the curvature should be continuously decreasing over the forward portion of the vehicle. As a result of its convexity, all portions of the space craft 10 will lie within any cone of gyration of a tangent to the surface of the craft. Also, sunlight reflection can be controlled by controlling the space craft attitude within the limits allowed by angle of incidence $\theta$. Furthermore, infrared detection can be controlled by emitting any excess heat from a rear curved portion 18 of the space craft 10.

For the utilization of the phenomena of radar invisibility of an infinite cone the space craft 10 should have a surface perimeter measured from the apex 16 around the rear curved portion 18 and back to the apex 16 of at least ten wavelengths of the minimum frequency which can be used to detect the space craft 10. Thus any radar signal must travel over the surface of the space craft for ten wavelengths before again reaching the apex 16 for reradiation.

In traveling such distances substantially all of the surface wave energy will be dissipated. Assuming search radar of a frequency as low as 100 megacycles can accurately penetrate the ionosphere, this would require such a perimeter to be nearly 100 feet or the vehicle length to be about 40 feet or greater. However, it is expected that this invention will be used primarily on manned or other space craft which are much larger than this and have major axial dimensions of the order of 100 feet or more whereby this criterion is easily met.

Moreover, if the whole surface of the space craft 10 is coated with a thin lossy dielectric, incident radar waves will be refracted into the coating and will dissipate somewhat more rapidly. As a result, the present invention can be useful on much smaller space craft. Such a lossy dielectric material can be made of many polymers having many types of lossy fillers. One example of such a system would be a millimeter thick coating of Teflon partially filled with minute particles of carbon. Many other lossy dielectrics are known to those skilled in this art. However, care should be used to prevent any waveguide effect which might occur if the coating approached a quarter wavelength of the highest frequencies used in search radar. Thus the maximum permissible coating thickness is of the order of one-half centimeter.

Referring now to FIGS. 2, 3, and 4 the space craft 10 has a metallic skin 20 surrounding an aperture 22. This aperture 22 may be a signal information aperture along a side surface of the space craft 10, as indicated in FIG. 1, or a freight port either on the side or the rear curved portion 18. Irrespective of the location of the aperture 22, the door 24 cannot be made in a manner to prevent the occurence of a discontinuity around a circumferential seam 25 thereof. Although physically a tight fit may be accomplished between the aperture 22 and the door 24, electronically a discontinuity must exist. In order to effectively eliminate the discontinuity of the seam 25, I have provided a lossy washer 26 surrounding the aperture 22 and a lossy plug 28 covering the door 24.

In the plan view of FIG. 2, the aperture 22 and the washer 26 are shown as circular. In accordance with the present invention, the taper of the lossy material at the outer edge of the washer 26 is such that its outward radius of curvature R in the outer edge region 30 (FIG. 3) is no less than two wavelengths of the lowest frequency which can accurately probe the location of the space craft 10.

Assuming a 100 megacycle search radar signal can be used during optimum ionospheric conditions, this radius of curvature should be no less than 20 feet. The outer edge or rim 32 of the washer 26 is arranged to taper electronically to the same impedance as free space. Thus, although I have shown the rim 32 in FIG. 3, it is electronically invisible. When a thin lossy dielectric coating is placed over the metallic skin, that portion of it under the lossy washer 26 will increase in lossiness in the same manner as the base of the lossy washer 26.

The central portion of the lossy washer 26 in the region of the aperture 22 is constructed to be two wavelengths thick. Since for all practical purposes the minimum reliable radar frequencies usable to search out such space craft are of the order of 1000 megacycles, the thickness of the lossy washer 26 and the lossy plug 28 need be no greater than two feet. However, greater thicknesses will provide additional protection from lower frequency search radar signals.

Additionally, both the lossy plug 28 and the lossy washer 26 provide an increasing lossy characteristic from their outer surfaces 34 toward their inner surfaces 36. This is usually accomplished by the use of greater amounts of lossy material such as powdered or filamented carbon 38.

Referring specifically to FIG. 4, the surface 20 of the space craft 10 is provided with a detent region 40 in which the lossy washer 26 and the lossy plug 28 are constructed.

Obviously such an arrangement is preferable from the standpoint of aerodynamics if the door 24 is arranged on a portion of the space craft 10 which is exposed during lift off. However, again care must be taken in connection with the radius of curvature R in the inner edge region 30' to avoid reflections due to first and second order derivatives discussed above.

In summary, the invisibility of the large space craft 10 is made possible by providing a contour which is substantially equivalent to an infinite conducting cone having a relatively sharp apex 16 and no discontinuities of either first order or second order throughout its surface. This dictates that such a space craft must be relatively large as a function of the lowest radar frequencies which can be reasonably used to detect it. The present invention enhances the utility of such space craft by providing a means of interior access which will not disturb the overall radar invisibility of the vehicle.

While I have shown and described particular embodiments of the present invention, further modifications and improvements will occur to those skilled in this art. For instance, the lossy washer 26 or its equivalent may be arranged with controlled gradient permittivity and dielectric constant properties in combination with lossy contours to obtain a reduced volume of the washer while still preventing any reflections. I desire it understood, therefore, that this invention is not limited to the particular forms shown, and I intend by the appended claims to cover all such modifications which do not depart from the true spirit and scope of my invention.

What I claim is:

1. In combination with a space craft arranged to electronically simulate an infinite conducting cone with respect to frequencies of illuminating radar which may reasonably be expected to impinge thereon, an access port camouflage arrangement, comprising:

a lossy washer surrounding a port and arranged with an outer rim and a central aperture, and having a tapered physical configuration such that the rim has a thickness of the order of a few microns and the aperture has a thickness of the order of at least two wavelength of the illuminating radar with the thickness graduation in the region of the outer edge having a radius of curvature no less than said two wavelengths;

lossy matter partially filling said washer with the loss tangent of the lossy matter being least at the rim and greatest at the inner surface near the aperture;

a lossy plug arranged to substantially fill the aperture of said washer and substantially cover a port door with a uniform thickness of no less than said two wavelengths, and filler matter in said plug being of increased loss tangent only from the outer to the inner surface thereof.

2. In combination with a space craft having a skin surface arranged to electronically simulate an infinite conducting cone with respect to frequencies of illuminating radar which may reasonably be expected to impinge thereon, an access port camouflage arrangement, comprising:

a lossy washer surrounding a port and arranged with an outer rim and a central aperture, and having a tapered physical configuration such that the rim has a thickness of the order of a few microns and the aperture has a thickness of the order of at least two wavelengths of the illuminating radar;

lossy matter partially filling said washer with the loss tangent of the lossy matter being least at the rim and greatest at the inner surface adjacent to the aperture;

a lossy plug arranged to substantially fill the aperture of said washer and substantially cover a port door with a uniform thickness equal to that of the aperture, and filler matter in said plug being of increased lossy gradient only from the outer to the inner surface thereof.

3. In combination with a space craft having a conductive skin surface arranged to electronically simulate an infinite conducting cone with respect to frequencies of illuminating radar which may reasonably be expected to impinge thereon, an access port camouflage arrangement, comprising:
   a lossy washer surrounding a port and arranged with an outer rim and a central aperture, and having a tapered physical configuration such that the rim has a thickness of the order of a few microns and the aperture has a thickness which is large compared to the wavelengths of the illuminating radar; and
   lossy matter partially filling said washer with the loss tangent of the lossy matter being least at the rim and greatest at the inner surface adjacent to the aperture.

4. In combination with a space craft having a conductive skin surface arranged to electronically simulate an infinite conducting cone with respect to frequencies of illuminating radar which may reasonably be expected to impinge thereon, an access port camouflage arrangement, comprising:
   a lossy washer surrounding a port and arranged with an outer rim and a central aperture, and having a tapered physical configuration such that the rim has a thickness of the order of a few microns and the aperture has a substantially greater thickness; and
   lossy matter partially filling said lossy washer with the loss tangent of the lossy matter being least at the rim and greatest at the inner surface adjacent to the aperture, said physical configuration being such that no portion of the inner or the outer surface of said lossy washer has a radius of curvature less than said two wavelengths.

5. In combination with a space craft having a conductive skin surface arranged to electronically simulate an infinite conducting cone with respect to frequencies of illuminating radar which may reasonably be expected to impinge thereon, an access port camouflage arrangement, comprising:
   a lossy washer surrounding a port and arranged with an outer rim and a central aperture, and having a tapered physical configuration such that the rim has a thickness of the order of a few microns and the aperture has a thickness of the order of at least two wavelengths of the illuminating radar;
   the conductive skin surface of the space craft being provided with a detent to accommodate said lossy washer to provide a smooth outer surface for the space craft throughout the region of said lossy washer; and
   lossy matter partially filling said lossy washer with the loss tangent of the lossy matter being least at the rim and greatest at the inner surface adjacent to the aperture.

6. In combination with a space craft having a conductive skin surface arranged to electronically simulate an infinite conducting cone with respect to frequencies of illuminating radar which may reasonably be expected to impinge thereon, an access port and door camouflage arrangement, comprising:
   a lossy washer surrounding a port and arranged with an outer rim and a central aperture, providing access to the port and having a tapered physical configuration such that the rim has a thickness of the order of a few microns and the aperture has a thickness of the order of at least two wavelengths of the illuminating radar, said physical configuration being such that no portion of the inner or the outer surface of said lossy washer has a radius of curvature less than said two wavelengths;
   lossy matter partially filling said washer with the loss tangent of the lossy matter being least at the rim and greatest at the inner surface adjacent to the aperture;
   a door positionable to close said port;
   a lossy plug secured to said door for filling the aperture of said lossy washer to provide a smooth outer surface throughout the region of the aperture;
   and lossy matter partially filling said plug with the loss tangent being greatest adjacent to said door and least at the outer surface thereof.

7. In combination with a space craft having a conductive skin surface arranged to electronically simulate an infinite conducting cone with respect to frequencies of illuminating radar which may reasonably be expected to impinge thereon, an access port and door camouflage arrangement, comprising:
   a lossy washer surrounding a port and arranged with an outer rim and a central aperture, providing access to the port and having a tapered physical configuration such that the rim has a thickness of the order of a few microns and the aperture has a thickness of the order of at least two wavelengths of the illuminating radar, said physical configuration being such that no portion of the inner or the outer surface of said lossy washer has a radius of curvature less than said two wavelengths;
   lossy matter partially filling said washer with the loss tangent of the lossy matter being least at the rim and greatest at the inner surface adjacent to the aperture;
   a door positionable to close said port and being constructed of conductive material similar to that of the space craft skin surface;
   a lossy plug arranged to cover said door, and to fill the aperture of said lossy washer to provide a smooth outer surface throughout the region of the aperture; and
   the conductive skin surface of the space craft being provided with a detent to accommodate said lossy washer and said lossy plug to provide a smooth outer surface throughout the region of said lossy washer.

No references cited.

CHESTER L. JUSTUS, *Primary Examiner.*